United States Patent Office 2,891,418
Patented June 23, 1959

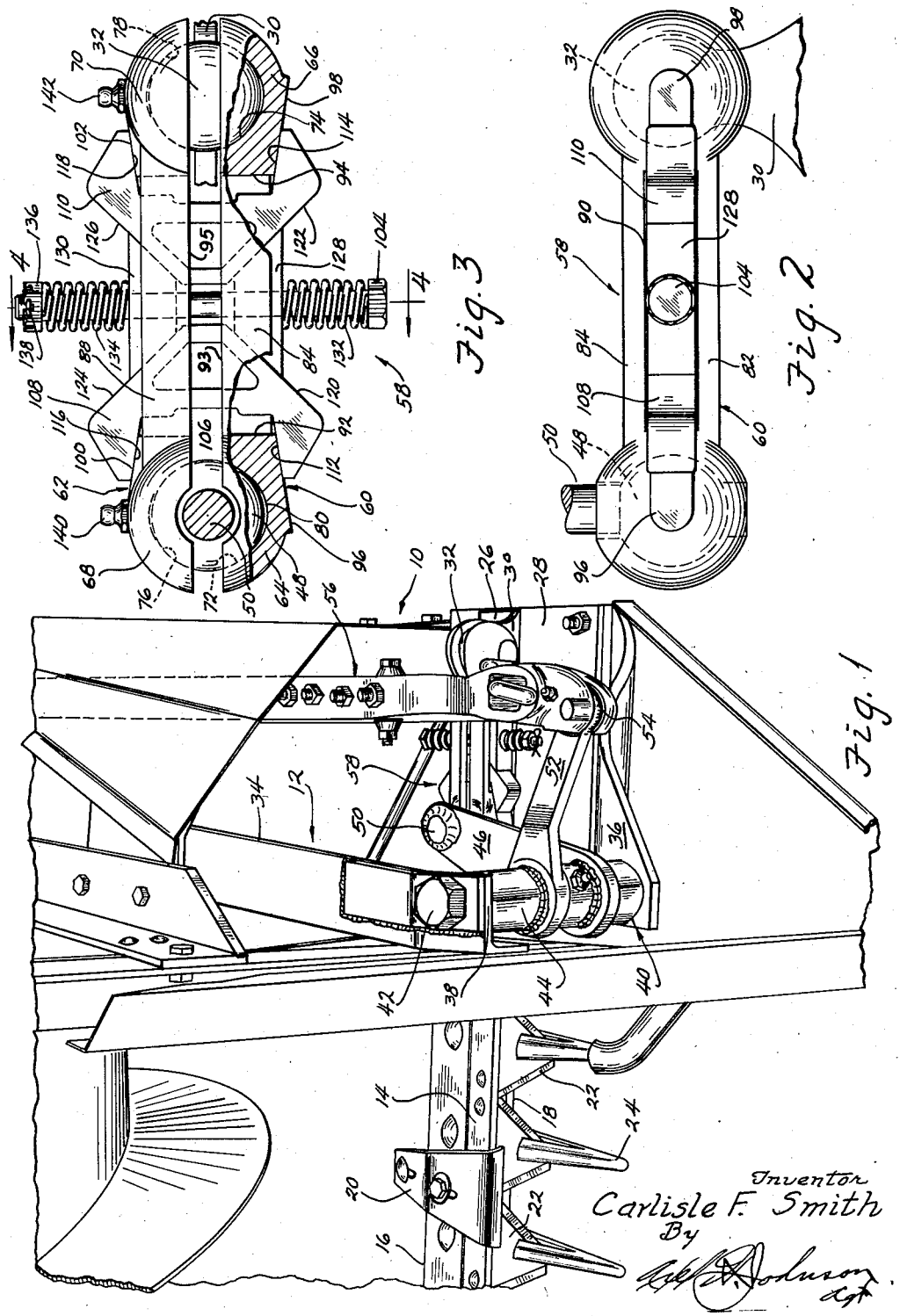

2,891,418

WEAR-COMPENSATING LINK

Carlisle F. Smith, Knoxville, Ill., assignor to J. I. Case Company, Racine, Wis., a corporation of Wisconsin Application June 8, 1956, Serial No. 590,145

3 Claims. (Cl. 74—579)

This invention relates to implements provided with reciprocating cutter bars usually found on harvesting machines such as windrowers, combines and mowers. This invention especially relates to the link connecting the bar with the bell crank, the latter transferring the reciprocating motion from the usual pitman to the link. Fig. 5 of the patent to Morris 602,586 for a Mowing Machine shows an example of a simple link over which the present invention is an improvement.

Generally, cutter bars reciprocate at the rate of 200 to 450 or more times per minute. The sudden reversal at the end of each stroke is responsible for excessive wear of the various parts. Wear of the surfaces between the link-ends and the spherical bearing portions is objectionable in that it introduces severe vibration resulting in breaking of parts of the implement, and a reduction in the length of effective cutting stroke of the cutter bar.

An object of this invention is to provide a connecting link having means to compensate for wear.

Another object is to provide a link which automatically compensates for wear.

Another object is to provide a link that is so constructed that wear will be automatically compensated for at both ends of the link simultaneously, and without attention of the operator.

Further objects and advantages will become apparent from a consideration of the following detailed description taken in connection with the accompanying drawings, wherein a satisfactory embodiment of the invention is shown. However, it is to be understood that the invention is not limited to the details disclosed, but includes all such variations and modifications as fall within the spirit of the invention.

Referring to the drawing:

Fig. 1 shows a fragmentary front perspective view of a harvester showing the reciprocating mechanism and cutter bar.

Fig. 2 is an elevational, enlarged fragmentary view of the invention as assembled on the spherical bearing portions.

Fig. 3 is a plan view of the link shown in Fig. 2, and with portions broken away to show the spherical bearing portions.

Figure 4:
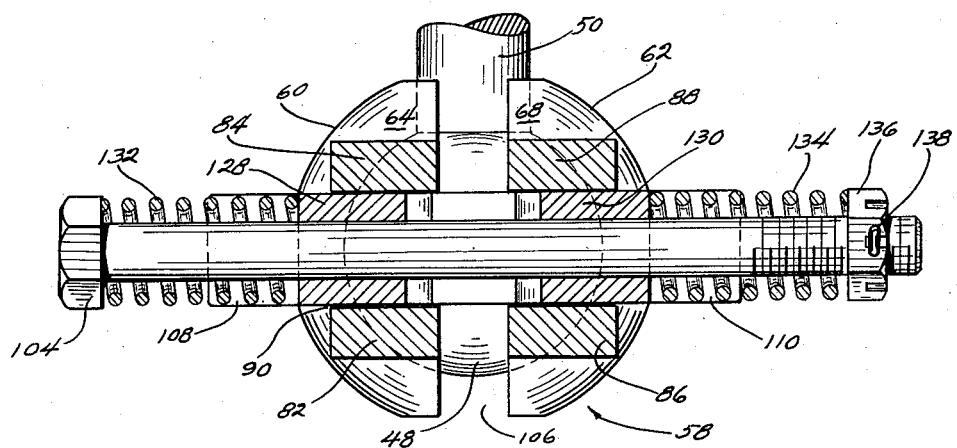
Fig. 4 is a partial section taken at 4—4 of Fig. 3.

Fig. 1 shows a portion of the harvester 10 of an implement which in this instance is a combine. However, the invention can be adapted to any similar implement requiring a cutter bar. Harvester 10 is provided with a frame 12 which has a transversely-reciprocating cutter bar 14. Bar 14 is supported in the conventional manner as by an abutting member 16 which provides support against rearward pressure during the cutting of grain, and a rail member 18 secured to the frame 12 below the bar 14 upon which the latter rests. A hold-down clamp 20 is employed to hold bar 14 against forward displacement and also in contact with sickle sections 22. The usual sickle guards 24 are provided and are secured to rail member 18.

Cutter bar 14 extends transversely of the harvester and terminates at 26 as shown in Fig. 1. A hold-down plate 28 confines bar 14, to a reciprocating movement. Bar 14 is provided with a head 30 which has secured integrally therewith a spherical bearing portion 32.

Frame 12 is provided with a for-and-aft-extending angle member 34 spaced a distance above bar 14, and is secured to the major portion of the frame 12 by bolts or other means of fastening. A bracket 36 is spaced below angle member 34 and is secured in a conventional manner to frame 12. Angle member 34 is provided with a horizontal web 38 which is parallel to the web of bracket 36.

A bell crank 40 is positioned intermediate the opposed surfaces of web 38 and bracket 36, and is journaled on a pin or bolt 42 so as to freely rotate. Crank 40 comprises a sleeve 44 containing suitable bearings not shown. A generally rearwardly-extending crank arm 46 is welded in this instance to sleeve 44 as shown in Fig. 1, and terminates at a point above bar 14. A spherical bearing portion 48 is provided below arm 46 and which has a shank 50 that extends through a hole in arm 46 as shown in Fig. 1 and is welded therein.

A second arm 52 is welded to sleeve 44, spaced axially above arm 46 and at an angle thereto of approximately 90 degrees in this instance. Arm 52 terminates in a spherical bearing portion 54.

A pitman bar 56 of the conventional type is connected to bearing portion 54 and is provided with means to automatically compensate for wear. Bar 56 extends rearwardly and is connected to a crank or other means of providing reciprocation.

Link 58, which is the subject matter of this invention, is shown in Figs. 1 through 4 and comprises a pair of generally identical jaw portions 60 and 62 allochirally opposed as shown in Fig. 3, and embracing one of the spherical bearing portions 32 and 48, one at each end of the jaw portions.

Jaw portions 60 and 62 comprise end portions 64, 66, 68, and 70, and are of the form shown. The inner surfaces of the end portions indicated at 72, 74, 76, and 78 conform to the spherical bearing portions 32 and 48 with the exception of a relief such as at 80 of Fig. 3. As very little wear takes place at this point, it has been found desirable to provide this relief in order to prolong the life of the link. In absence of the relief, wear of surfaces 72, 74, 76, and 78 would permit considerable end play.

End portions 64, 66, 68, and 70, are connected by strut portions 82, 84, 86, and 88 as shown in Figs. 2, 3, and 4, leaving an elongated slot 90 transversely through both jaw portions 60 and 62. Slot 90 extends towards end portions 64, 66, 68, and 70, and terminates at points 92 and 94, and is substantially normal to surfaces 93 and 95 of portions 60 and 62 respectively.

The gist of this invention is the means of automatically compensating for wear between the spherical bearing portions 32 and 48, and surfaces 72, 74, 76, and 78. End portions 64, 66, 68, and 70 are provided with inclined surfaces 96, 98, 100, 102, which converge toward an intermediate point of the jaw portions as shown in Fig. 3. A bolt 104 is passed through slot 90 normally to the gap 106 between jaw portions 60 and 62.

A pair of adjusting jaws 108 and 110 are fitted loosely in slot 90 and have inclined surfaces 112, 114, 116, and 118 which coincide with surfaces 96, 98, 100, and 102, respectively. Jaws 108 and 110 have inclined surfaces 120, 122, 124, and 126 which converge toward bolt 104. A pair of wedges 128 and 130 are provided which are a loose fit in slot 90 and which have holes that permit placing them on bolt 104 as shown in Figs. 2 to 4. Wedges 128 and 130 have surfaces in contact with inclined surfaces 120, 122, 124, and 126.

Springs 132 and 134 are provided which are a free fit on bolt 104, one being placed against each of wedges 128, and 130. A nut and cotter 136 and 138 respectively secure wedges 128 and 130 in resilient contact with adjusting jaws 108 and 110. A pair of grease fittings 140 and 142 are provided in end portions 68 and 70 so as to provide lubrication for spherical bearing portions 32 and 48.

When link 58 has been assembled on bearing portions 32 and 48, nut 136 is adjusted so as to cause wedges 128 and 130 to urge jaws 108 and 110 toward the spherical bearing members, thus causing the end portions 64, 66, 68, and 70 to grip the bearing portions and maintain a proper fit. It is clear that wedges 128 and 130 will urge jaws 108 and 110 toward their respective end portions so that a like pressure is applied to both spherical bearing portions. Thus is true because the assembly of bolt 104, wedges 128 and 130, and jaws 108 and 110 are permitted to float unrestrictedly in the direction of the axis of bolt 104, and also toward spherical bearing portions 32 and 48. It will be clear that this novel arrangement will permit proper functioning notwithstanding considerable variations in dimensions of the components. Therefore, if springs 132 and 134 exert sufficient pressure on wedges 128 and 130, wear taking place between the spherical bearing portions and their related inner surfaces of jaw portions 60 and 62 will be automatically compensated.

The above being a complete description of an illustrative embodiment of the invention, what is claimed as new and desired to be secured by Letters Patent of the United States is:

1. In an implement having a frame, a crank on said frame and a cutter bar reciprocal on said frame, said crank and bar each provided with a spherical bearing portion having centers common to a plane, a link connecting said bearing portions comprising a pair of allochirally-opposed jaws, one on each side of plane and having ends provided with spherical seats embracing said bearing portions, and aligned slots normal to said plane, means to maintain contact between said spherical bearing portions and said seats comprising a bolt central in said slots and normal to said plane, said ends provided with outward-facing plane surfaces inclined toward said bolt and said plane, an adjusting jaw at each end of said slot, normal to said plane and provided with inclined surfaces coinciding with and engaging said outwardly-facing inclined plane surfaces, said adjusting jaws having allochirally-related surfaces converging toward said plane, wedge members on said bolt engaging said last mentioned surfaces to bias said adjusting jaws toward said spherical bearing members by adjusting said wedge members in the direction of the axis of said bolt in order to maintain contact between said spherical bearing members and said spherical seats, and resilient means on said bolt to constantly urge said wedge members toward said plane.

2. In an implement having a frame, a crank on said frame and a cutter bar reciprocal on said frame, said crank and bar each provided with a spherical bearing portion having centers common to a plane, a link connecting said bearing portions comprising a pair of allochirally-opposed jaws facing said plane and having ends provided with spherical seats embracing said bearing portions, and a longitudinal aperture normal to said plane, means to maintain contact between said spherical bearing portions and said seats comprising a bolt central in said aperture and normal to said plane, said ends provided with outwardly-facing plane surfaces inclined toward said bolt and said plane, an adjusting jaw at each end of said aperture embracing said inclined surfaces, said adjusting jaws having mutually-opposed surfaces converging toward said plane, wedge members on said bolt and engaging said converging surfaces to bias said adjusting jaws toward said spherical bearing members to assure contact of the latter by said spherical seats, and resilient means on said bolt to constantly urge said contact.

3. In an implement having a frame, a crank on said frame and a cutter bar reciprocal on said frame, said crank and bar each provided with a spherical bearing portion having centers common to a plane, a link connecting said bearing portions comprising a pair of allochirally-opposed jaws having ends provided with spherical seats embracing said bearing portions, and a longitudinal aperture normal to said plane, means to maintain contact between said spherical bearing portion and said seats comprising an adjusting member central in said aperture and normal to said plane, said ends provided with outwardly-facing plane surfaces inclined towards said adjusting member and said plane, an adjusting jaw at each end of said aperture, embracing said inclined surfaces, said adjusting jaws having mutually-opposed surfaces converging toward said plane, wedge member on said bolt and engaging said last-named surfaces to bias said adjusting jaws toward said spherical bearing members to assure contact of the latter by said spherical seats, and resilient means on said adjusting member to constantly maintain said contact.

References Cited in the file of this patent
UNITED STATES PATENTS

| | | |
|---|---|---|
| 348,034 | Mitchell | Aug. 24, 1886 |
| 1,499,298 | Eller | June 24, 1924 |
| 1,643,017 | Hufferd | Sept. 20, 1927 |
| 1,936,556 | Lautz | Nov. 21, 1933 |
| 2,184,587 | Ekstrand | Dec. 26, 1939 |
| 2,300,335 | Bonebrake | Oct. 27, 1942 |
| 2,365,067 | Gauld | Dec. 12, 1944 |
| 2,694,319 | Johnson | Nov. 16, 1954 |